United States Patent [19]

Nelsen

[11] 4,161,342
[45] Jul. 17, 1979

[54] ANTI-FRICTION GIBS FOR PRESSES
[75] Inventor: Roger J. Nelsen, Hastings, Mich.
[73] Assignee: Gulf & Western Manufacturing Company, Southfield, Mich.
[21] Appl. No.: 857,121
[22] Filed: Dec. 5, 1977
[51] Int. Cl.² ............................................. F16C 29/04
[52] U.S. Cl. .................... 308/6 R; 308/3 A; 308/4 C
[58] Field of Search ............... 308/3, 6, 4 C, 204, 308/205

[56] References Cited
U.S. PATENT DOCUMENTS

| | | | |
|---|---|---|---|
| 2,581,022 | 1/1952 | Japikse | 308/3 R |
| 3,455,610 | 7/1969 | Meinke | 308/6 R |
| 3,907,385 | 9/1975 | Bartenstein | 308/6 C |
| 3,971,599 | 7/1976 | Shio | 308/3 A |

*Primary Examiner*—Douglas C. Butler
*Attorney, Agent, or Firm*—Meyer, Tilberry & Body

[57] ABSTRACT

In an industrial mechanical press, anti-friction gibs are provided to replace conventional V-type bronze gibs without requiring extensive rebuilding of the press. Linear roller bearings, and their associated flat races, are substituted for plain bronze gibs which enable zero clearance to be obtained between the press slide and frame, thereby effectively reducing off-center die loading and friction on the slide.

11 Claims, 7 Drawing Figures

ANTI-FRICTION GIBS FOR PRESSES

THE PRIOR ART

It is conventional to provide means for wear between the moving slide and stationary sides of a mechanical press. Such means, particularly in small high speed presses, may comprise so called V-gibs, or gibbing, which are customarily non-ferrous such as bronze. V-gibs serve as wear pads between the press sides and mating V-shaped horizontal extensions on opposite sides of the slide which reciprocate within the confines of the V-gibs. Either one, or both, of the V-gibs may be adjusted laterally to provide for proper clearance between the slide and the gibs. However, the amount of clearance required for the slide to run free without overheating also permits lateral movement of the slide. For certain precision press operations this lateral play between the slide and the press sides cannot be tolerated because unacceptable off-center loading of the die results. The problem of off-center loading of dies is particularly aggravated in multiple press operations wherein several independent dies must be held in alignment, usually without the benefit of leader pins.

THE INVENTION

The present invention submits as a solution to the problem of lateral press slide movement the replacement of conventional plain bronze gibbing with linear roller bearings and races. The plain bronze gibs are removed from the press and flat hardened steel races are mounted on the slide and press sides respectively with rollers suitably caged to run between opposite races. One press side is provided with an adjustable mounting block to which the side race is mounted. This mounting block is laterally adjustable to obtain zero clearance between the slide, the rollers and the press side. A pair of rack and pinion type guide mechanisms are employed to keep the bearings moving with the slide and to keep them from working up or down. One rack segment of each pair of mechanisms is fixed to the top of one of the press sides and the other rack segment of the mechanism is fixed to and moves with the slide. Each pinion is fixed to a vertically reciprocating pinion block which is slidably mounted on a pair of pins vertically secured to a press side. When the pinion rolls between the two rack segments it and the pinion block move vertically at half the speed of the slide. The roller cages are also attached to the pinion block to move at half the speed of the slide.

OBJECTS OF THE INVENTION

It is therefore among the objects of the invention to provide in a mechanical press: a replacement for standard V-type bronze gibbing which does not require a major redesign or rebuilding of the press; improved gibbing which can be adjusted to zero clearance to effectively eliminate lateral movement of the press slide; improved gibbing to reduce friction between a press slide and the press sides; anti-friction, hardened steel gibbing which will provide longer life than conventional bronze gibbing; anti-friction gibbing which will reduce wear between press parts and provide longer press life; and, anti-friction gibbing which will enable better registry between die parts.

Other objects, features and advantages of the invention will become apparent in light of the following detailed description of the preferred embodiment shown and described herein and as illustrated in the accompanying drawings, in which.

THE DISCLOSURE

Figure 1:
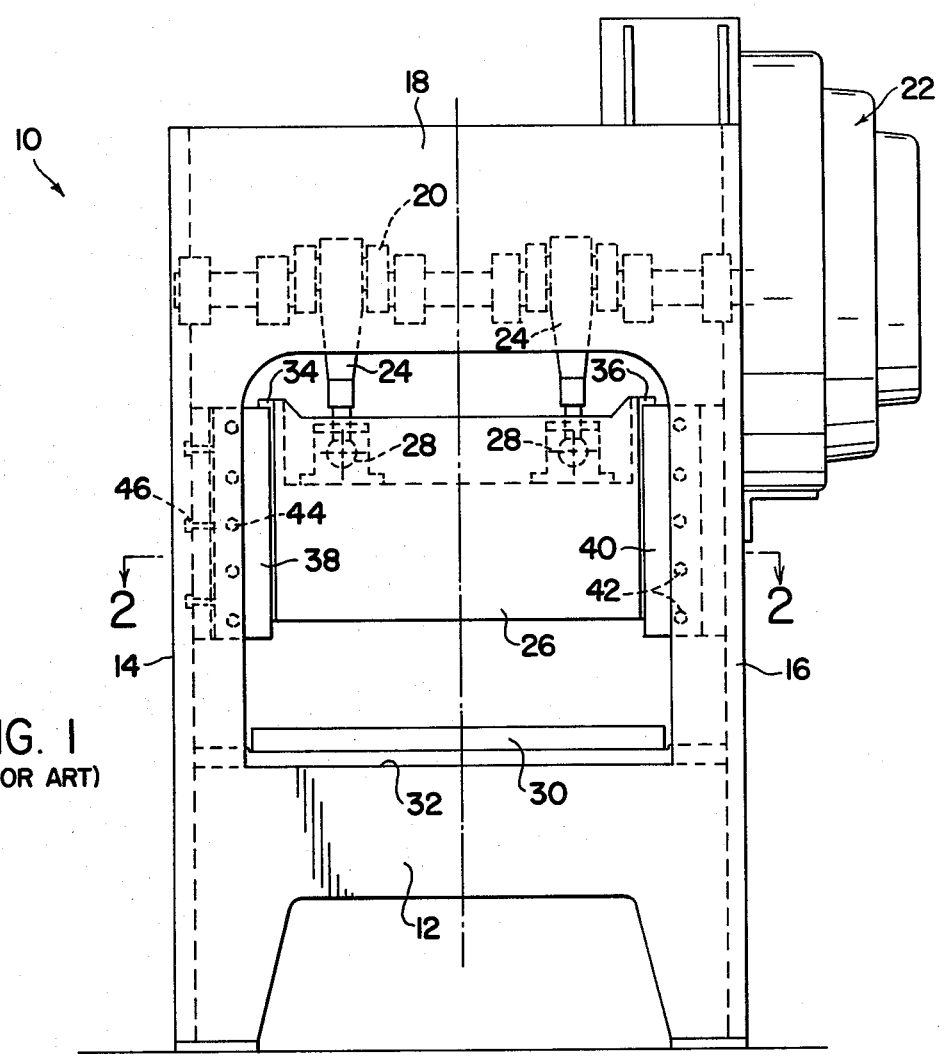
FIG. 1 is an elevational view of a typical conventional mechanical press equipped with bronze gibbing convertible to anti-friction gibbing, the subject of this invention.
Figure 2:
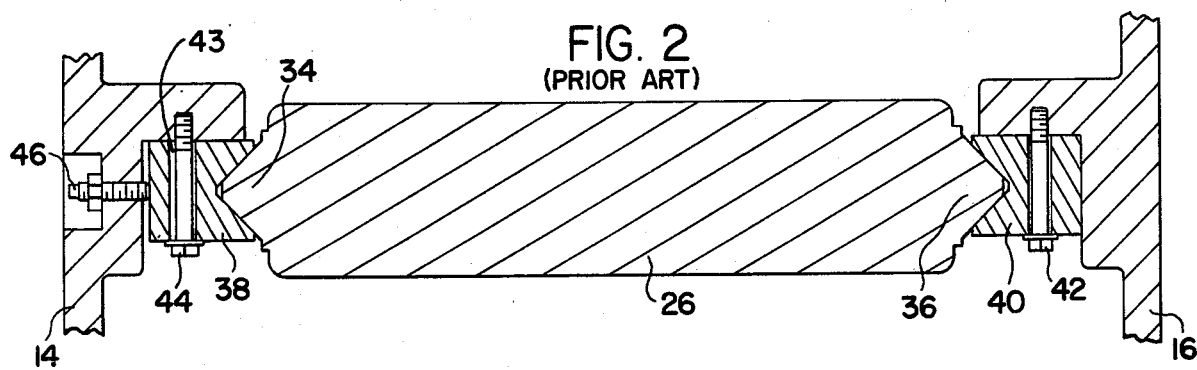
FIG. 2 is a sectional view of conventional press bronze gibbing taken along line 2—2 of FIG. 1.

Reference is first made to FIG. 1 wherein is shown in elevation a conventional mechanical press 10 having a frame 12 including side members 14 and 16, a crown 18 in which is journaled a double throw crankshaft 20, drive means 22, a pair of connecting rods 24 secured to a slide 26 by ball and socket means 28, and a bolster 30 secured to the bed 32 of the press to which the lower of a pair of dies (not shown) is secured. Slide 26 is provided with a pair of male V-shaped portions 34 and 36 (FIG. 2) which are guided for reciprocable movement in matching female V-shaped gibs 38 and 40 respectively. In a typical embodiment, gib 40 may be non-adjustably secured to press side member 16 by means of a threaded fastener 42, whereas gib 38 may be laterally adjustable. Gib 38 is secured to press side member 14 by threaded fastener 44 which passes through gib 44 to make threaded engagement with side member 14. Adjusting space 43 is provided between gib 38 and threaded fastener 44. By loosening threaded fastener 44 and turning set screw 46, gib 38 may be moved toward or away from slideway 34 within the limits provided by adjusting space 43. When the correct positioning between gib 38 and slideway 34 is obtained, gib 38 is locked into place by retightening threaded fastener 44. With plane bearing surfaces such as slideways 34 and 36 and gibs 38 and 40 sufficient clearance must be provided to prevent the slideways from overheating and binding. With high speed presses this is a serious problem inasmuch as the faster the press operates the more heat is generated and the more tendency there is to bind between the slide and the gibs if insufficient clearance is provided. On the other hand, if sufficient clearance is provided to permit free running of the slide in the gibways, lateral movement of the slide can take place resulting in imperfect registry between the upper and lower dies. In the manufacture of small parts, or where short runs are being made, dies may be mounted in so called die sets wherein the upper and lower dies are joined together by pins upon which the upper die slides thereby improving registry between dies. However, for larger press operations and for multiple slide press operations, die sets are not feasible.

Figure 3:
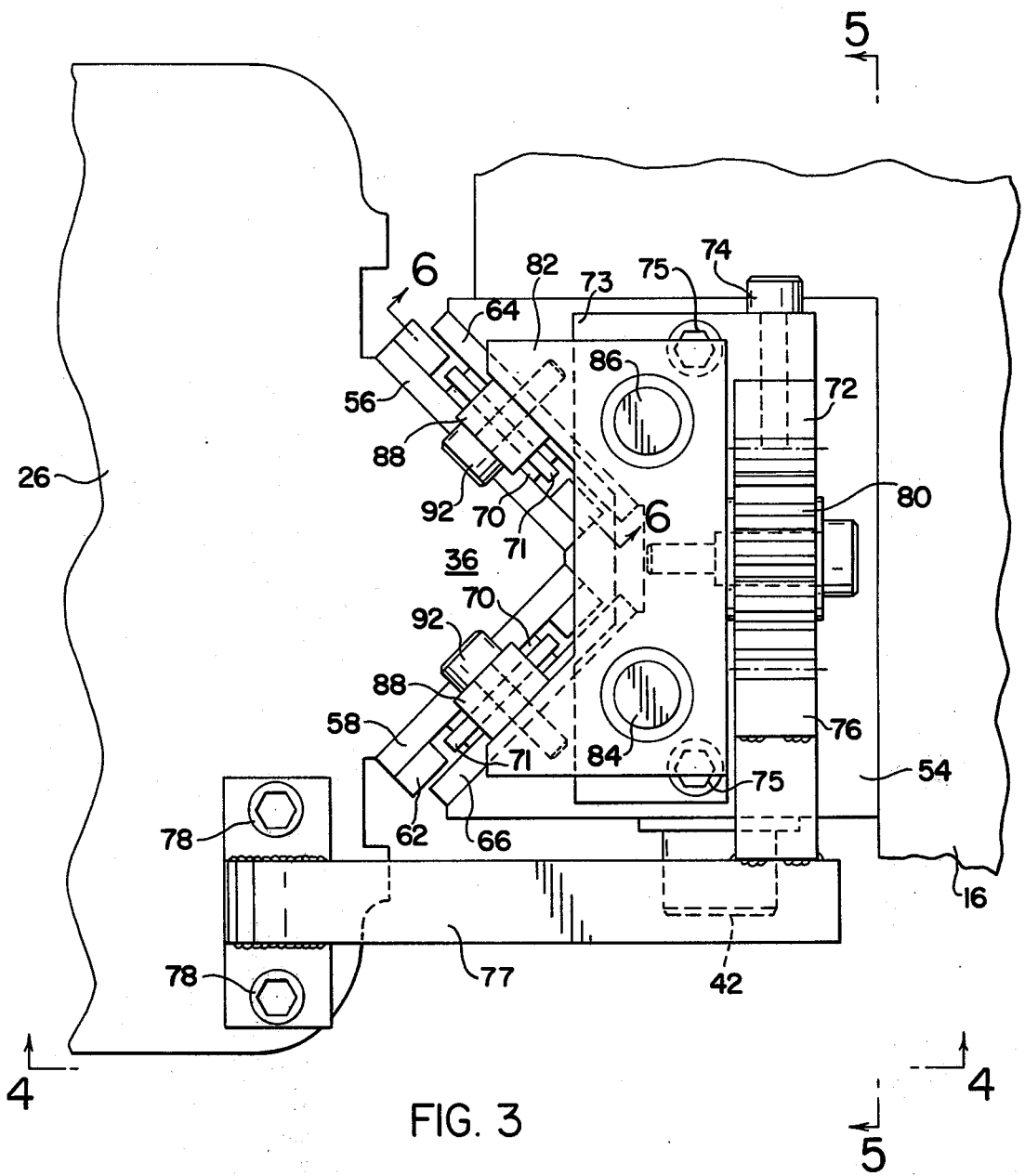
FIG. 3 is a plan view of the preferred embodiment of the invention adaptable for use on the conventional press shown in FIG. 1.
Figure 4:
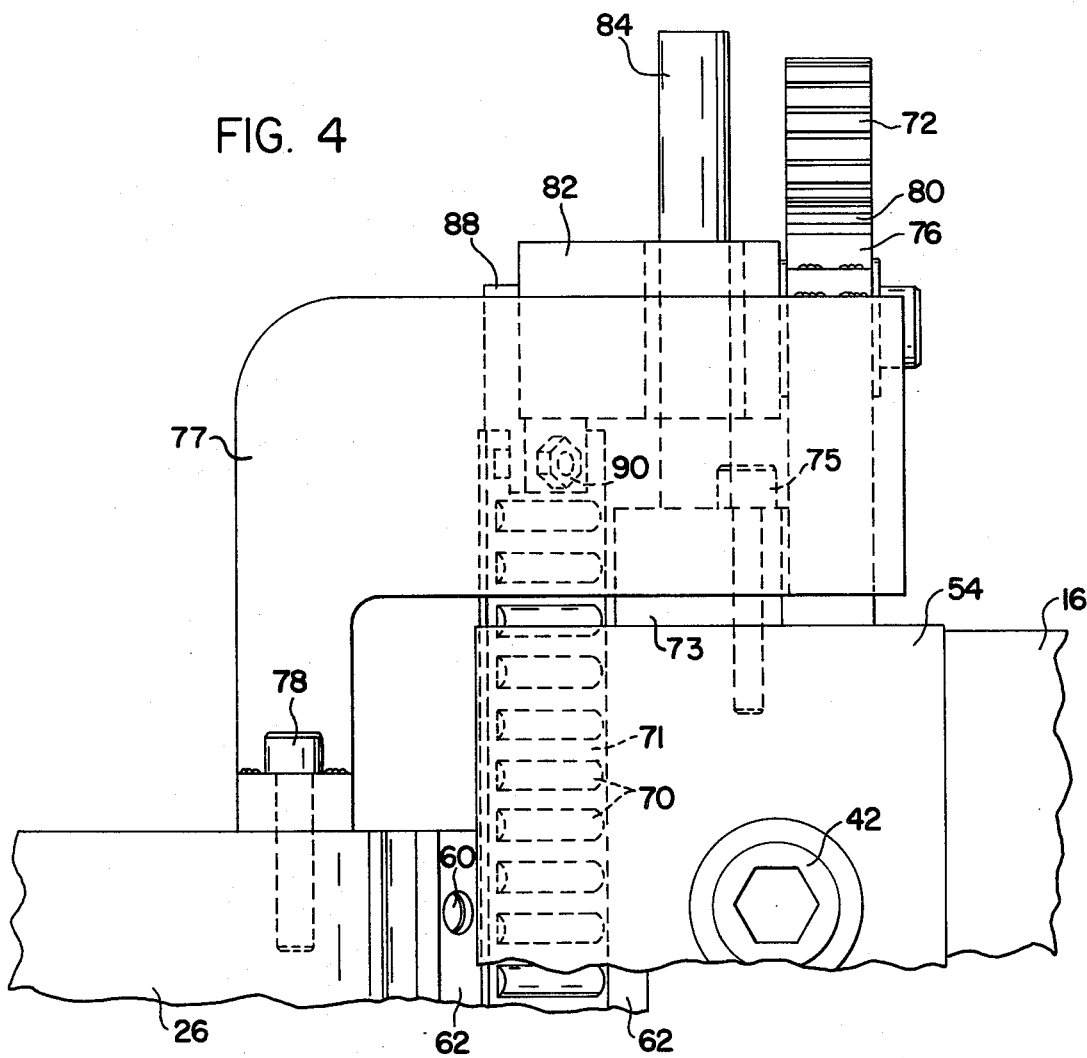
FIG. 4 is an elevational view of the preferred embodiment of the invention taken along line 4—4 of FIG. 3.
Figure 5:
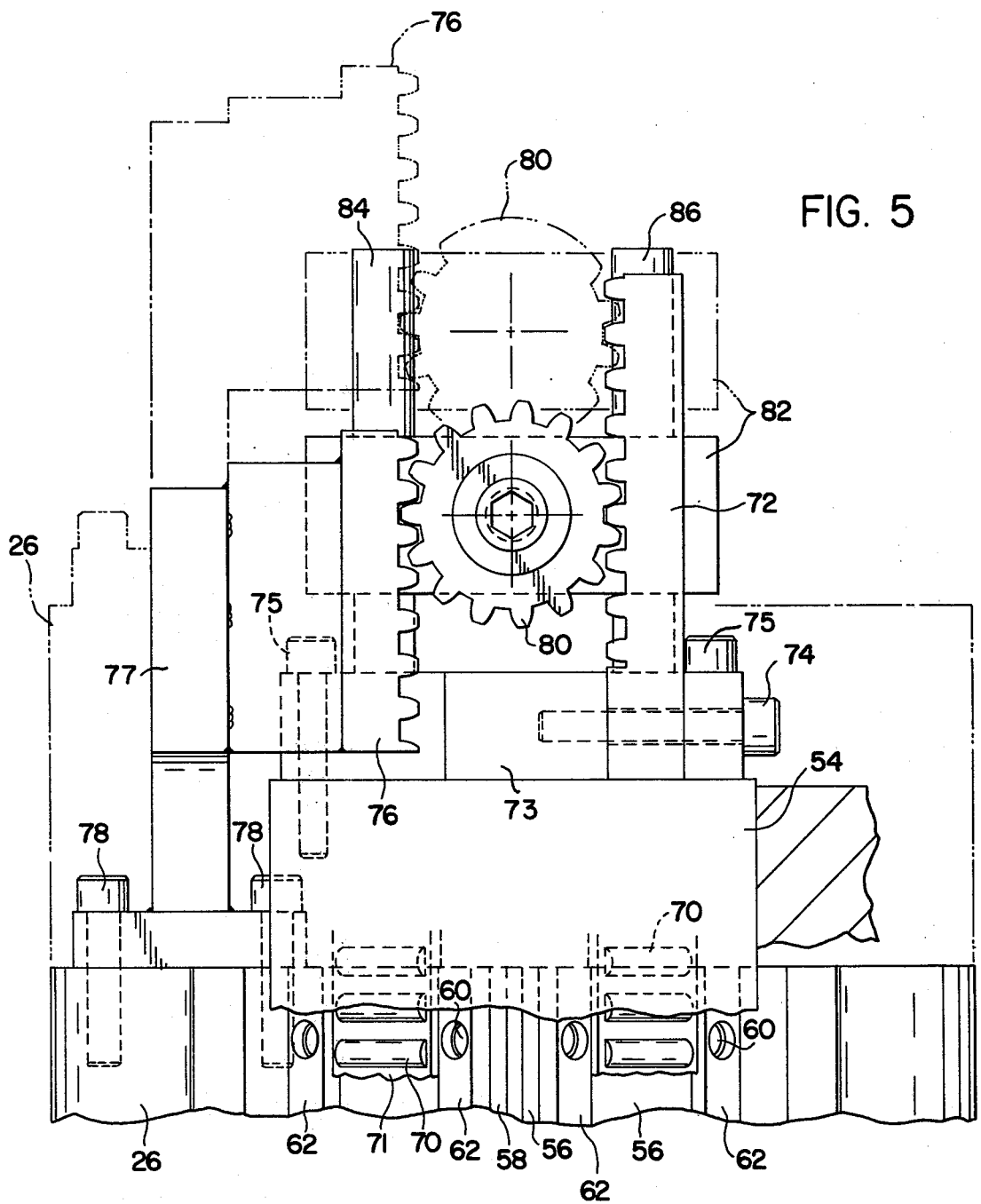
FIG. 5 is an elevational view of the preferred embodiment of the invention taken along line 5—5 of FIG. 3.
Figure 6:
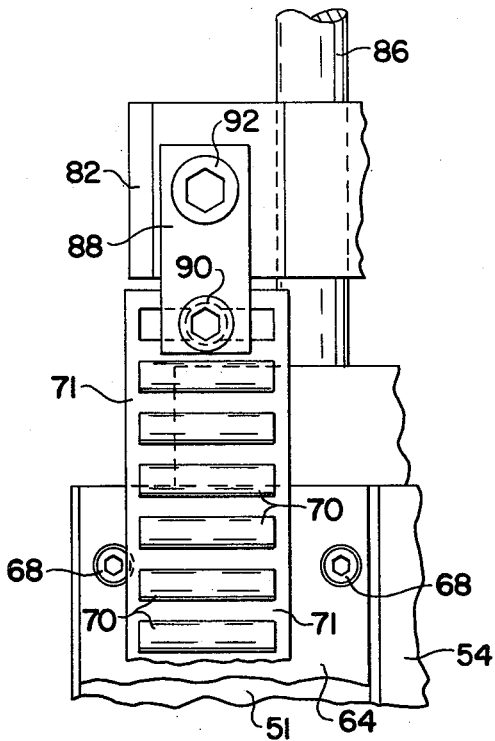
FIG. 6 is a fragmentary elevational view of the preferred embodiment of the invention taken along line 6—6 of FIG. 3; and, FIG. 7 is a sectional view as it would appear taken along line 2—2 of FIG. 1 after the press of FIG. 1 has been modified with the preferred embodiment.

In the subject invention, as shown in FIGS. 3, 4 and 5, the conventional gibbing 38 and 40 is removed from press sides 14 and 16 and is replaced with similar steel gibs of hardened steel. The bearing surfaces of the steel gibs are scrapped or ground flat and true, the hardened facings becoming the races for linear roller bearings.

Figure 7:
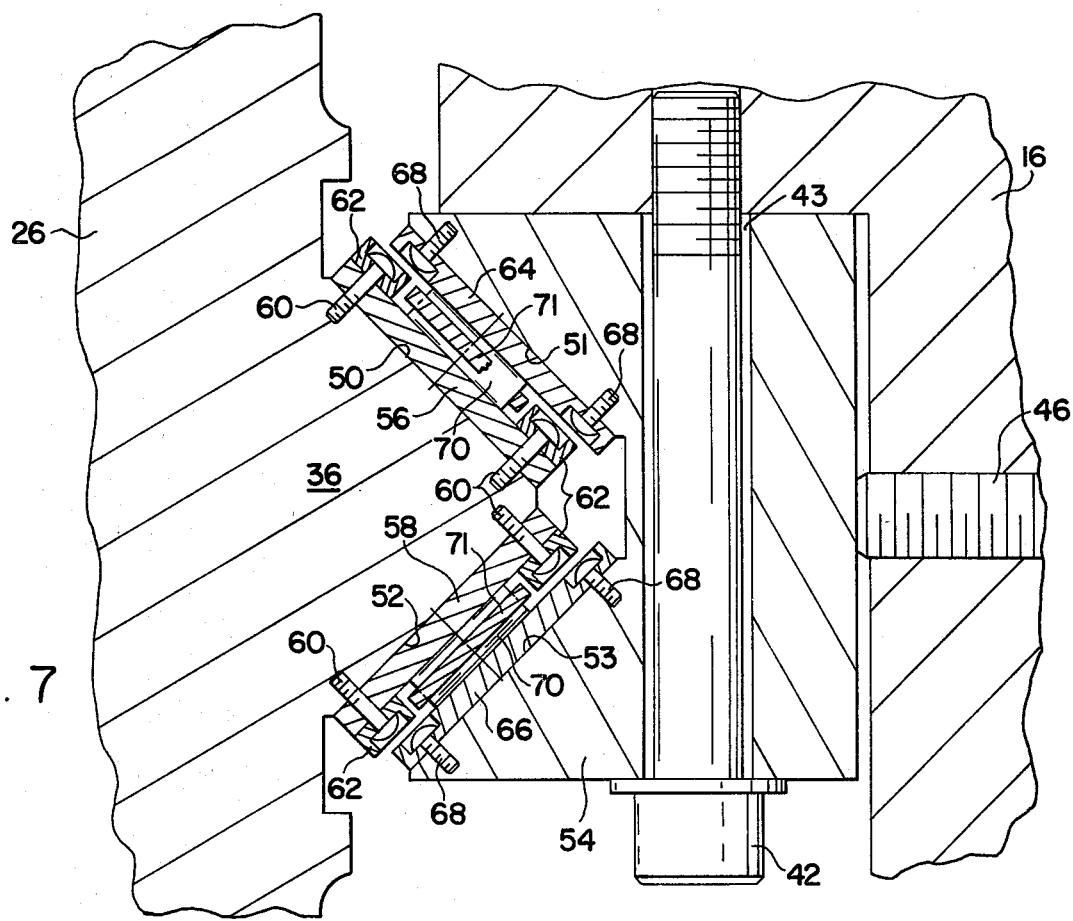

Description of the gibbing on the right side 16 of the press, as illustrated in FIGS. 3–7, will be sufficient for a full understanding of the invention, inasmuch as substantially identical gibbing will also be provided on the left side of the press. As shown in FIG. 7, slide bearing surfaces 50 and 52 are ground or otherwise prepared to a high degree of flatness. The bronze V-type gibs 38 and 40 are replaced with steel gib blocks 54, which are mounted on the press sides on opposite sides of the press slide by means of threaded fasteners 42. It will be noted that, similar to FIG. 2, adjusting space 43 is provided between threaded fastener 42 and steel gib block 54. Thus, by loosening threaded fastener 42 and by adjusting set screw 46, gib block 54 may be shifted to the right or to the left as required (see FIG. 7). By so shifting gib block 54, the spacing between the hardened steel strips 56–64 and 58–66 will be correspondingly adjusted. When the desired spacing is obtained between the hardened steel strips 56–64 and 58–66, gib block 54 is locked into place by retightening threaded fastener 42. The bearing surfaces of the steel gib blocks are also provided with true flat surfaces 51 and 53 in the same manner as the corresponding surfaces 50 and 52 of the slide 26. With bearing surfaces 50 and 52 of the slide 26 and the surfaces 51 and 53 of the gib block 54 rendered acceptably flat, the bearing surfaces 50 and 52 of the slide 26 are faced with hardened steel strips 56 and 58. These strips are bolted onto the bearing surfaces 50 and 52 by means of threaded fasteners 60, which also secure strips 62 to the faces of the hardened strips 56 and 58. In similar manner, hardened steel strips 64 and 66 are secured to the steel gib block 54 by threaded fasteners 68. These hardened strips 56, 58, 64 and 66 then become the races for linear roller bearings 70 which are retained in linear roller cages 71.

To secure the cages 71 and to keep the bearings 70 moving with the slide 26 as well as to prevent the bearings from working up and down, a rack and pinion type guide mechanism has been developed as illustrated in FIGS. 3, 4 and 5. Therein is disclosed one rack segment 72 (FIGS. 3 and 5) secured to a mounting block 73 by threaded fastener means 74. Mounting block 73 is in turn secured by threaded fasteners 75 to the top of gib block 54, which is bolted to side member 16 by threaded fastener 42. A second rack segment 76 is secured, in the preferred embodiment shown, by weldment to an L-shaped bracket 77 (FIG. 4) which is secured to slide 26 by threaded fasteners 78, whereby the rack 76 will move with the slide 26. A pinion 80 is rotatably mounted on a pinion block 82 which is adapted to slide on pins 84 and 86. With the press slide 26 in operation, rack segment 76 will move at the same speed and distance as the slide 26 to rotatably drive pinion 80 to linearly run in fixed rack segment 72 at half the vertical speed of the slide. Block 82, in turn, will be reciprocated vertically by pinion 80 at half the speed of the slide 26. Bearing cages 71 are attached by strap 88 and threaded fastener means 90 and 92 (FIG. 6) to the pinion block 82 and accordingly are also reciprocated at half the speed of the slide.

From the foregoing description of the invention, it will be appreciated that the invention provides relatively inexpensive means for overcoming the problems of excessive lateral thrust of the slide in a mechanical press because of the necessary adequate clearance between the slide and its gibs in order to assure free movement without overheating. With the present invention, lateral thrust of the slide 26 is reduced to zero by gib block adjustment screw 46 (FIG. 7) which brings roller bearings 70 into contact with races 56–64 and 58–66, respectively. Thus, with a minimum of modification of the press per se and at relatively low cost, a serious problem of die alignment has been corrected with the present invention.

Although a preferred embodiment of the invention has been shown and described, other embodiments within the contemplation of this invention will occur to those skilled in the art upon reading the foregoing disclosure. Therefore, it is intended that this invention be limited only by the scope of the appended claims.

Having thus described the invention, it is claimed:

1. In a mechanical press having a frame including a pair of side members and a press slide mounted therebetween, the improvement in anti-friction gib means comprising: a flat steel race secured to a vertical surface on each side of said press slide adjacent a side member; flat steel races positioned opposite each of said press slide races and secured to vertical surfaces of each of said press side members and parallel to said press slide races; rollers positioned between said opposed races; roller retaining means to retain said rollers between said races; and means to reciprocate said roller retaining means responsive to the movement of said slide.

2. The device of claim 1, including means to reciprocate said roller retaining means at one-half the speed of said slide.

3. The device of claim 1, including means to provide clearance between said press slide races and said press side member races.

4. The device of claim 1, including rack and pinion means to reciprocate said roller retaining means.

5. The device of claim 1, including a vertically shiftable block mounted on said press frame; connecting means between said shiftable block and said roller retaining means; and means to reciprocate said block responsive to movement of said slide.

6. The device of claim 1, including a shiftable block mounted on said press frame; connecting means between said shiftable block and said roller retaining means; and means to reciprocate said block comprising a rack secured to said slide, a rack secured to said press frame; a pinion in rolling engagement between said racks, said pinion being rotatably mounted on said block.

7. In a mechanical press having a frame including a pair of side members and a press slide therebetween, anti-friction gib means comprising: first flat rectangular steel races secured to opposite sides of said press slide; second flat rectangular steel races secured to said press side members opposite and parallel to said first steel races; rollers positioned to run between said opposed races; linear cage means to contain said rollers; a vertically reciprocable block mounted on said press frame; means to attach the upper end of said cage means to said block; rack means secured to said press slide and adapted to reciprocate therewith; non-reciprocating rack means secured to said press frame; a pinion rotatably mounted on said reciprocable block in driven engagement with said reciprocating rack and in rolling engagement with said stationary rack, whereby said pinion reciprocates said block and said block reciprocates said linear cage responsive to the movement of said slide.

8. In a mechanical press having a frame including a pair of side members, a press slide and conventional plain metal gib means secured to the opposite sides of said press slide and to said side members to align said slide with said side members for reciprocal sliding movement therebetween, the method of replacing said plain metal gib means with anti-friction gib means comprising the steps of:
 (1) removing said plain metal gib means from said press slide and from said side members;
 (2) machining first flat vertical surfaces on opposite sides of said press slide;
 (3) machining second flat vertical surfaces on said side members opposite and parallel to corresponding first flat vertical surfaces on said press slide;
 (4) securing opposed flat hardened steel linear bearing races to said opposed machined surfaces;
 (5) positioning bearing cage contained bearings between opposed bearing races; and
 (6) securing said bearing cages to said press slide for reciprocal movement therewith.

9. The method of claim 8, including the step of:
 (1) interposing connecting means between said bearing cages and said press slide adapted to reciprocate said bearing cage at a slower speed than said press slide.

10. The method of claim 8, including the steps of:
 (1) securing a rack to said frame;
 (2) securing a rack to said press slide;
 (3) positioning a pinion to be driven by said press slide rack and to run on said frame rack;
 (4) securing a reciprocable connecting means on said frame;
 (5) securing said bearing cages to said reciprocable connecting means; and
 (6) rotatably securing said pinion to said reciprocable connecting means, whereby said pinion reciprocates said reciprocable connecting means at a slower speed than said press slide.

11. The method of claim 8, including the step of providing means to adjust the spacing between said flat hardened steel linear bearing races.

* * * * *